US006204801B1

(12) United States Patent
Sharka et al.

(10) Patent No.: US 6,204,801 B1
(45) Date of Patent: Mar. 20, 2001

(54) SYSTEM AND METHOD FOR OBTAINING PRECISE MISSILE RANGE INFORMATION FOR SEMIACTIVE MISSILE SYSTEMS

(75) Inventors: David Sharka, Tucson, AZ (US); Harvey J. Meltzer, Pomona, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/134,024

(22) Filed: Aug. 14, 1998

(51) Int. Cl.[7] ....................................................... G01S 13/72
(52) U.S. Cl. ................................. 342/62; 342/84; 342/85; 342/97; 342/114; 342/119
(58) Field of Search ................................... 342/62, 73, 82, 342/83, 84, 85, 86, 87, 88, 90, 97, 98, 99, 103, 105, 106, 109, 112, 114, 115, 119, 128, 129, 130

(56) References Cited

U.S. PATENT DOCUMENTS

| 3,631,485 | * | 12/1971 | Beazell, Jr. ............................. 342/59 |
| 4,290,066 | * | 9/1981 | Butler ..................................... 342/100 |
| 4,649,390 | * | 3/1987 | Andres et al. ......................... 342/140 |
| 5,112,006 | * | 5/1992 | Palmer .................................. 244/3.16 |
| 5,975,460 | * | 11/1999 | Elkanick et al. ..................... 244/3.15 |
| 6,025,795 | * | 12/1971 | Hulderman et al. .................. 342/45 |

FOREIGN PATENT DOCUMENTS

| 2000055591 | * | 2/2000 | (JP) . |
| 2000121293 | * | 4/2000 | (JP) . |

OTHER PUBLICATIONS

"Solutions of generalized proportional navigation with maneuvering and nonmaneuvering targets", Pin–Jar Yuan; Shih–Che Hsu, Aerospace and Electronic Systems, IEEE Transactions on, vol.: 31 Issue: 1, Jan. 1995, pp. 469–474.*
"True proportional navigation with maneuvering target", Ghose, D, Aerospace and Electronic Systems, IEEE Transactions on, vol.: 30 Issue: 1, Jan. 1994, pp. 229–237.*

"Generalized guidance law for homing missiles", Ciann–Dong Yang; Fei–Bin Hsiao; Fang–Bo Yeh, Aerospace and Electronic Systems, IEEE Transactions on, vol.: 25 Issue: 2, Mar. 1989, pp. 197–212, 1995.*

* cited by examiner

Primary Examiner—John B. Sotomayor
(74) Attorney, Agent, or Firm—David W. Collins; Glenn H. Lenzen, Jr.

(57) ABSTRACT

A system (10) for determining the range between a missile (14) and a target (18) adapted for use with a semi-active missile system. The system (10) includes a first circuit (12) for generating a periodic signal (24) that is periodically frequency modulated. A second circuit (16) determines a closing rate at which the missile 14 is approaching the target 18 via the periodic signal 24. A third circuit (16) determines a value containing information corresponding to the range and the closing rate via the periodic signal. A fourth circuit (16) determines the range from the closing rate and the value. In a specific embodiment, the first circuit (12) includes an illumination system (12). The illumination system (12) includes a periodically modulated carrier signal generator (32) that generates the periodic signal (24). The periodically modulated carrier signal generator (32) includes a frequency source, a frequency modulator, and an illumination system computer. The illumination system computer runs software for adjusting the modulation parameters of the frequency modulator. The second, third and fourth circuits (16) are included in a receiver system (16) onboard the missile (14). The receiver system (16) includes a front receiver located near the front of the missile and a rear receiver located near the rear of the missile (14). A receiver system computer runs software that implements the fourth circuit (16). The receiver system (16) includes a local oscillator for providing a reference frequency for the receiver system. The local oscillator derives the reference frequency from the periodic signal provided by the first circuit. In illustrative embodiment, the fourth circuit (16) runs computer software that subtracts the closing rate from the combination of closing rate and range and provides the range in response thereto.

32 Claims, 4 Drawing Sheets

SYSTEM AND METHOD FOR OBTAINING PRECISE MISSILE RANGE INFORMATION FOR SEMIACTIVE MISSILE SYSTEMS

BACKGROUND OF THE INVENTION

1. Field of Invention

This invention relates to missile guidance systems. Specifically, the present invention relates systems for determining missile closing rate and relative range with respect to a target.

2. Description of the Related Art

Missiles are used in a variety of demanding applications ranging from explosives delivery to satellite launching applications. Such applications often require accurate target closing rate and closing distance information to make in-flight steering and arming adjustments.

Missile guidance algorithms depend on accurate closing distance, i.e., range, and closing rate information to accurately time the activation of missile arming procedures and to successfully direct a missile to its target. Poor or corrupted missile closing rate and/or range information may cause premature missile detonation or missile targeting error.

In active missile systems, a transmitter onboard the missile facilitates ranging, i.e., a determination of the distance between the missile and the target. By measuring the round trip signal travel time for a signal transmitted via the transmitter and reflected back from the target, a range estimate is obtained.

Semi-active systems utilize a stationary or semi-stationary transmitter or illumination source. Semi-active missile systems often rely on an initial estimate of the target position and in-flight kinematic measurements provided by an onboard missile accelerometer such as an inertial reference unit (IRU) to estimate range. These systems typically lack the ability to accurately determine range when a target is in motion. Range estimated in this way is often grossly inaccurate and can result in inefficient missile guidance, increased fuel consumption and miss-timed missile detonation. All of these characteristics tend to reduce missile effectiveness.

To facilitate the determination of missile position, missiles used in military applications often include an IRU for taking missile kinematic measurements. The IRU has a sensor that detects changes in missile inertia. The changes in inertia are then used to compute missile acceleration, velocity, and position. The current missile position and velocity are calculated with reference to an initial position and velocity, respectively. However, initialization error and IRU measurement error accumulate over the flight of a missile, severely degrading missile position and target closing rate estimates.

In semi-active missile systems that rely on IRU measurements, an initial range measurement is stored in an onboard missile guidance computer. Activation of arming procedures is determined via the initial range measurement. However, if a maneuvering target accelerates or decelerates after missile launch, error in the range information grows in direct proportion to the deceleration or acceleration. Error in the range information may result in premature missile detonation or targeting errors.

Hence, a need exists in the art for a system for facilitating accurate determination of missile range, that is immune to IRU initialization error, and that is applicable to semi-active missile systems. There is a further need for a system for facilitating accurate determination of range to a rapidly maneuvering or accelerating target.

SUMMARY OF THE INVENTION

The need in the art is addressed by the system for determining the range between a missile and a target of the present invention. In the illustrative embodiment, the inventive system is adapted for use with a semi-active missile system and includes a first circuit for generating a periodic signal that is periodically frequency modulated. A second circuit determines a closing rate at which the missile is approaching the target via the periodic signal. A third circuit determines a value containing information corresponding to the range and the closing rate via the periodic signal. A fourth circuit determines the range from the closing rate and the value.

In a specific embodiment, the first circuit includes an illumination system. The illumination system includes a periodically modulated carrier signal generator that generates the periodic signal. The periodically modulated carrier signal generator includes a frequency source, a frequency modulator, and an illumination system computer. The illumination system computer runs software for adjusting the modulation parameters of the frequency modulator.

The second, third, and fourth circuits are included in a receiver system onboard the missile. The receiver system includes a front receiver located near the front of the missile and a rear receiver located near the rear of the missile. The missile system further includes receiver system computer that runs software that implements the fourth circuit. The receiver system includes a local oscillator that provides a reference frequency to the receiver system. The local oscillator derives the reference frequency from the periodic signal provided by the first circuit. In illustrative embodiment, the fourth circuit runs computer software that subtracts the closing rate from the combination of closing rate and range and provides the range in response thereto.

The receiver system computer is connected to the rear receiver and the rear local oscillator. The rear receiver and the rear local oscillator are connected to a downconverter in the receiver system. A front receiver and the rear receiver provide input to the downconverter. The rear local oscillator provides a reference frequency to the downconverter and the downconverter outputs a downconverted signal in response thereto. A Fast Fourier Transform circuit receives the downconverted signal and outputs a processed signal in response thereto to the receiver system computer.

The illumination system has an illumination system computer connected to a frequency source and a frequency modulator. Outputs of the frequency source and the frequency modulator are input to a combiner, the output of which is connected to a transmitter. The illumination system computer runs software for controlling the frequency of the frequency source, and modulation parameters of the frequency modulator.

The novel design of the present invention is facilitated by the periodically modulated carrier signal provided by the periodically modulated carrier signal generator. The periodically modulated carrier signal allows software running on the receiver system computer to extract range information from a combination of range information and closing rate information. The receiver system computer extracts range information via the periodically modulated carrier signal during periods of no modulation of the periodically modulated carrier signal. Similarly, the receiver system computer extracts the combination of range and closing rate information during periods of modulation of the periodically modulated carrier signal. Software running on the receiver system computer can then easily extract range information from the combination of range and closing rate information by subtracting off closing rate.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
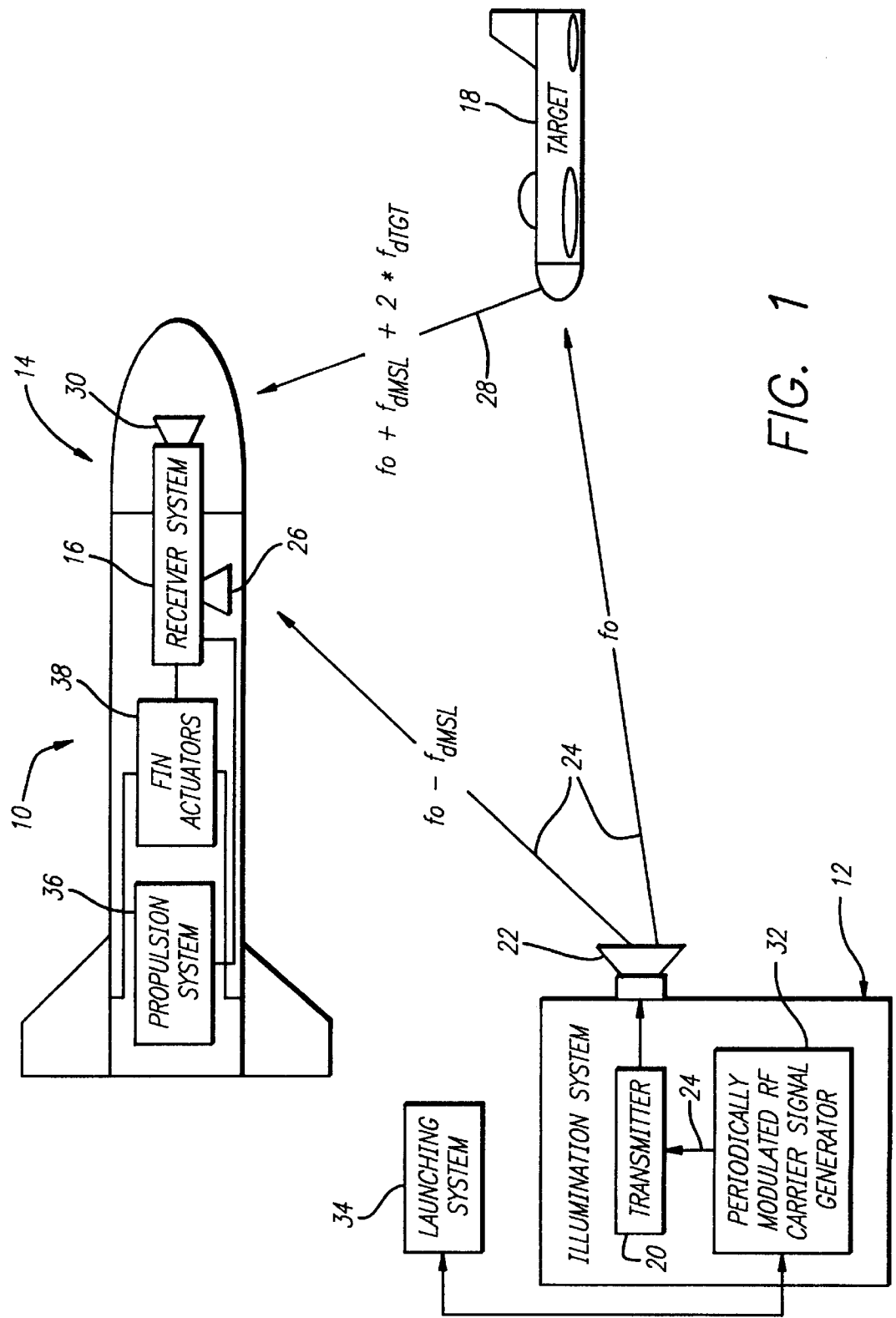
FIG. 1 is a diagram of the semi-active missile system of the present invention showing an illumination system, a missile with a receiver system, and a target.

FIG. 1 is a diagram of the semi-active missile system 10 of the present invention showing an illumination system 12, a missile 14 with a receiver system 16, and a target 18. The illumination system 12 is connected to a missile launching system 34 and includes a periodically modulated radio frequency (RF) carrier signal generator 32 connected to a transmitter 20 that is connected to an antenna 22. The periodically modulated carrier signal generator 32 generates a periodically modulated carrier signal 24 that is transmitted by the illumination system 12 via the transmitter 20 and the antenna 22. In the illustrative embodiment, the carrier signal 24 is a radio frequency (RF) signal.

The carrier signal 24 has a first constant frequency and second varying frequency. The first constant frequency ($f_o$) and the second varying frequency are maintained for a first non-modulated time interval and a second modulated time interval, respectively. During the first non-modulated time interval, the carrier signal 24 is non-modulated, and during the second time interval, the carrier signal 24 is modulated and has a predetermined peak-to-peak frequency range.

The transmitter 20 transmits the carrier signal 24 via the antenna 22. The carrier signal 24 is received by the receiver system 16 onboard the missile 14 via a rear antenna 26. In addition, the carrier signal 24 reflects off the target 18 resulting in a reflected signal 28 that is received by a front antenna 30 of the receiver system 16.

In the present embodiment, both the missile 14 and the target 18 are in motion with respect to the stationary illumination system 12. Due to the relative motion of the missile 14 with respect to the illumination system 12, the carrier signal 24 appears to the receiver system 16 to have a frequency of $f_o - f_{dMSL}$ during the non-modulated time interval, where $f_o$ is the first constant frequency and $f_{dMSL}$ is the Doppler frequency shift resulting from the motion of the missile 14. Similarly, the reflected signal 28 received by the front antenna 30 appears to the receiver system 16 to have a frequency of $f_o + f_{dMSL} + 2*f_{dTGT}$ during the non-modulated time interval where $2*f_{dTGT}$ is the Doppler frequency shift imparted to the reflected signal 28 due to the motion of the target 18.

The receiver system 16 has a computer (as discussed more fully below) that maintains pre-existing information about the constant frequency $f_o$. The Doppler shift $f_{dMSL}$ induced by the motion of the missile 14 is then easily determined by software running on the computer by taking into account velocity and acceleration information provided via an inertial reference unit (IRU) and an integration circuit (not shown) onboard the missile 14. Similarly, the Doppler shift $f_{dMSL}$ induced by the motion of the missile 14 may be approximated by subtracting the measured frequency ($f_o - f_{dMSL}$) of the received carrier signal 24 from the constant frequency $f_o$.

Once the Doppler shift $f_{dMSL}$ induced by the motion of the missile 14 is determined, the Doppler shift $2*f_{dTGT}$ caused by reflection from the moving target 18 is easily determined. The measured frequency ($f_o - f_{dMSL}$) of the received carrier signal 24 is added to the measured frequency of the reflected signal ($f_o + f_{dMSL} + 2*f_{dTGT}$). Twice the constant frequency ($2f_o$) is subtracted from the resulting quantity leaving $2*f_{dTGT}$ which is divided by two and added to $f_{dMSL}$ to determine a Doppler frequency shift representative of the net closing velocity between the missile 14 and the target 18. The above operations are implemented in software running on a receiver system computer (as discussed more fully below).

Those skilled in the art will appreciate that other methods such as those well known in the art for determining the closing rate via a constant frequency signal provided by an illumination source of a semi-active missile system may be used without departing from the scope of the present invention.

During the modulated time interval, a portion of the transmitted carrier signal 24 having a varying frequency is transmitted by the illumination system 12. The modulated portion may be visualized as a packet or a pulse in which the frequency varies by a predetermined amount, the width of the packet corresponding to the modulated time interval. The rear receiver 26 of the receiver system 14 receives the packet at a first moment in time. The front antenna 30 receives the corresponding packet reflected from the target 18 at a second moment in time. The difference between the first moment in time and the second moment in time is a function of the sum of the range and the Doppler shifts caused by the motion of the missile 14 and the target 18. Methods for extracting a combination of range and closing rate information in semi-active systems via a continuously modulated carrier illumination signal are known in the art.

By periodically modulating the carrier signal 24, a combination of closing rate and range is determined from the modulated time intervals and a closing rate is determined from the non-modulated time intervals via unique software running on a computer of the receiver system 16 (as discussed more fully below). The computer subtracts the closing rate determined during the non-modulated time intervals from the closing rate plus range determined during the modulated time interval to arrive at an accurate estimate of range. In this way, the system 10 effectively determines the distance from the missile 14 to the target 18 on a periodically updated basis even when the target 18 is moving. This estimate of range is then used to optimize missile guidance routines and arming procedures and to optimize missile fuel expenditure, guidance, and missile detonation timing, thereby greatly enhancing the performance of the semi-active missile system 10.

The missile system 10 also includes a missile launching system 34 in communication with the illumination system 12. When the missile 14 is launched via the launching system 34, the illumination system 12 is activated via an activation signal from the launching system 34 or visa versa. Also, the missile 14 includes a missile propulsion system 36, missile steering actuators 38, and a missile arming system (not shown) that are controlled via the computer (as discussed more fully below) in the receiver system 16. Precise range information provided via the receiver system 16 enables the computer in the receiver system 16 to optimize missile steering functions, fuel consumption, and arming functions.

Figure 2:
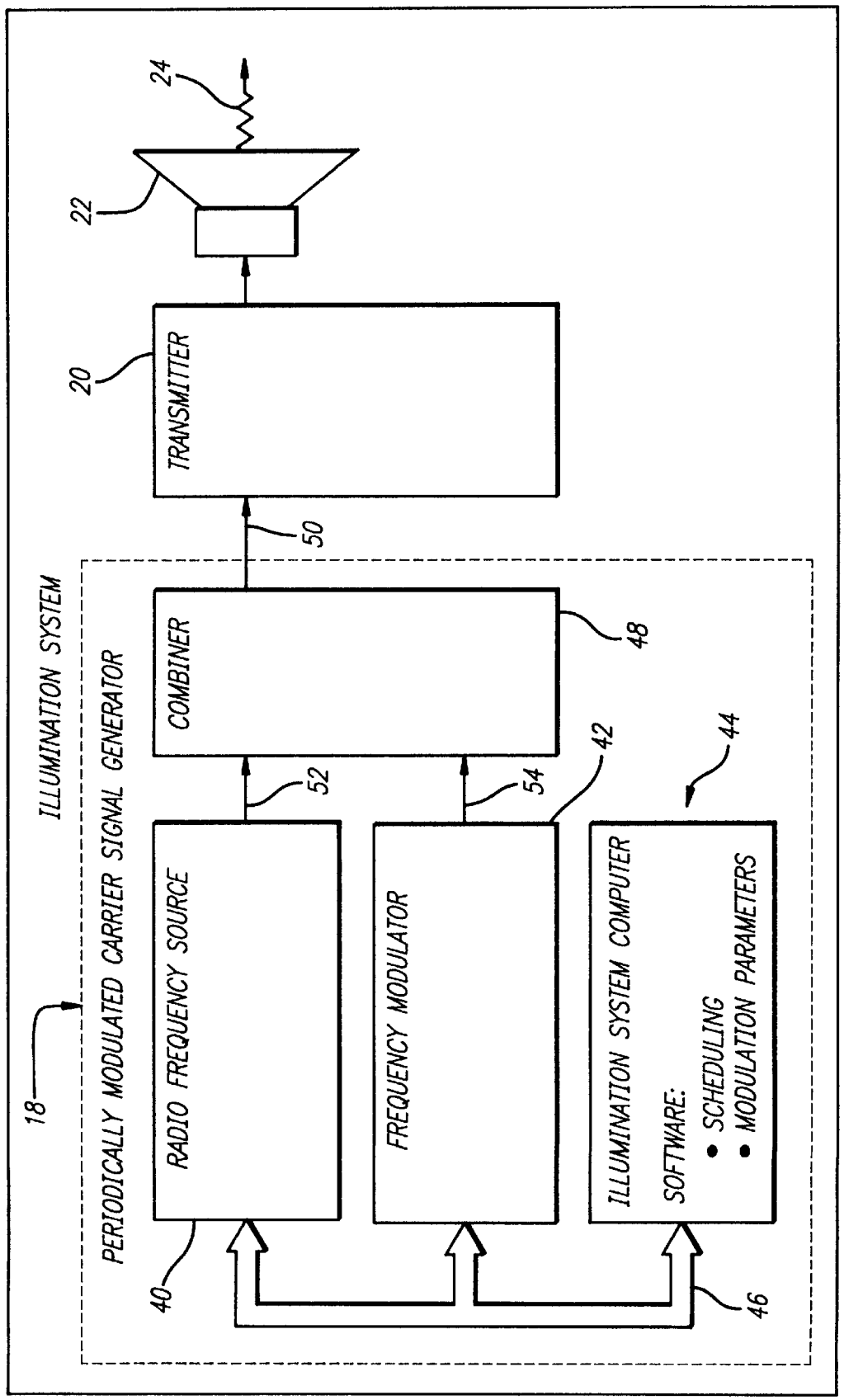
FIG. 2 is a more detailed block diagram of the illumination system of FIG. 1.

FIG. 2 is a more detailed block diagram of the illumination system 12 of FIG. 1 showing the periodically modulated carrier signal generator 32 connected to the transmitter 20 that is in turn connected to the antenna 22. The carrier signal generator 32 includes a radio frequency source 40, a frequency modulator 42 and an illumination system computer 44 in mutual communication via a bus connector 46. Outputs from the radio frequency source 40 and the frequency modulator 42 are fed to a combiner 48. A periodically modulated combiner output signal 50 output from the combiner 48 is input to the transmitter 20 in preparation for transmission via the antenna 22.

The illumination system computer 44 runs software for controlling radio frequency source 40 and the frequency modulator 42. Frequency parameters such as the frequency generated by the radio frequency source 40 and modulation parameters such as the rate at which the signal output from the radio frequency source 42 is periodically modulated. Software running on the illumination system computer 44 performs additional tasks such as selective activation of the radio frequency source 40 and the frequency modulator 42 in response to the launching of a missile via the launching system 34 of FIG. 1.

Those skilled in the art will appreciate that the illumination system computer 44 may perform other additional tasks without departing from the scope of the present invention. In addition, the radio frequency source 40 may be another type of frequency source such as a laser or microwave source without departing from the scope of the present invention.

With reference to FIGS. 1 and 2, when the missile 14 is launched toward the target 18, the radio frequency source 40 and the frequency modulator 42 are activated via the illumination system computer 44. The frequency modulator 42 provides a modulation signal 52 modulated at a predetermined rate to the combiner 48. The radio frequency source 40 provides a non-modulated radio frequency signal 52 having a predetermined constant frequency to the combiner 48. In the combiner 48, the modulated signal 54 and the radio frequency signal 52 are combined to produce a periodically modulated combiner output signal 50. The combiner output signal 50 is fed to the transmitter 20 and antenna 22 and then transmitted as the periodically modulated carrier signal 24.

By way of example, the periodically modulated carrier signal 24 may be an interrupted continuous wave (ICW) signal with a pulse width of 15 milliseconds and a repetition rate of 60 milliseconds, wherein every tenth pulse is modulated by a swept frequency of 85 Hertz. This results in a peak to peak carrier frequency deviation of +/−2 MHz.

Once the non-modulated pulses, i.e., pulses other than every tenth pulse, are analyzed for closing rate information by the software running on the computer (as discussed more fully below) in the illumination system, the modulated pulses are analyzed. Analysis of the modulated pulses via the receiver system (as discussed more fully below) leaves a Doppler value containing both range and closing rate information. The software then makes a subtraction that yields range information.

For the above example, a difference frequency of 4 MHz is a measure of the range to the target: (4 MHz/(1/85)sec)(1 sec/3E8 meters)*2 way=(34/15)Hz/meter. Thus, a target 300 meters away from the missile would yield a range Doppler of 6800 Hz assuming a collinear missile-target arrangement.

The design and construction of frequency sources, frequency modulators, combiners, transmitter and antennas are well known in the art. In addition, software for controlling the frequency modulator 42 and the radio frequency source 40 may be easily developed by those ordinarily skilled in the art. In the alternative, existing software may be modified or combined to effectively control the radio frequency source 40 and the frequency modulator 42 by one of ordinary skill in the art.

Figure 3:
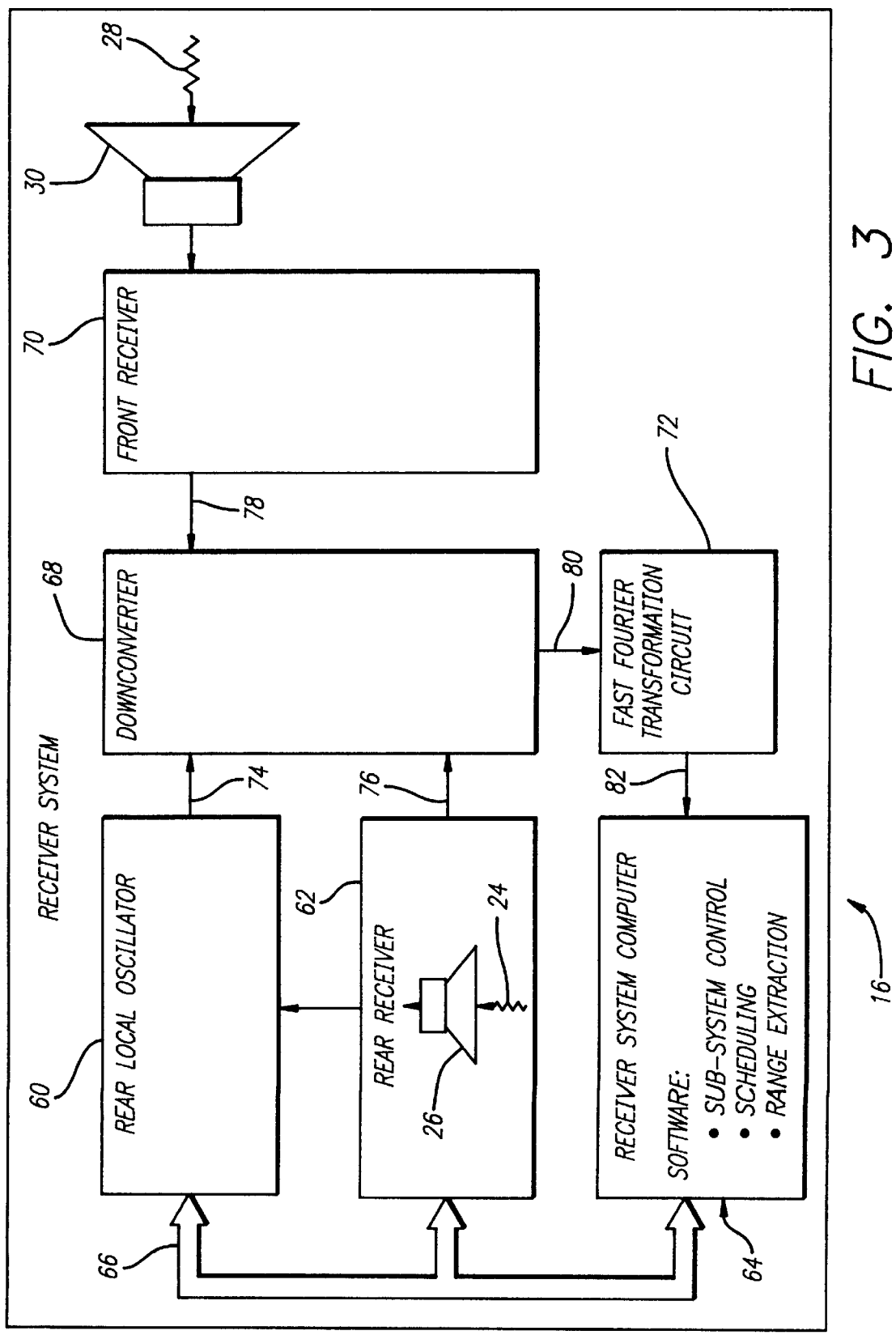
FIG. 3 is a more detailed block diagram of the receiver system of the missile of FIG. 1.

FIG. 3 is a more detailed block diagram of the receiver system 16 of the missile 14 of FIG. 1. The receiver system 16 includes a rear local oscillator 60, a rear receiver 62 with the accompanying rear antenna 26, and a receiver system computer 64 in mutual communication via a bus connector 66. A front receiver 70 is connected to the front antenna 30 and provides input to a downconverter 68. The downconverter 68 receives input from the rear local oscillator 60, the rear receiver 62 and the front receiver 70. The downconverter 68 provides output to a Fast Fourier Transform circuit (FFT) 72, the output of which provides input to the receiver system computer 64.

In operation, the rear receiver 62 receives the periodically modulated carrier signal 24. After reception of the carrier signal 24, the rear receiver 62 directs the carrier signal 24 to both the rear local oscillator 60 and the downconverter 68. The rear local oscillator 60 locks to a multiple of the frequency of the carrier signal 24, adjusts the gain of the carrier signal and noise shapes it if needed by methods well known in the art. The rear local oscillator 60 then outputs a reference frequency signal 74 in response to the multiple of the carrier signal. In the present specific embodiment, the multiple is one.

The downconverter 68 receives the carrier signal 24 as a rear receiver output signal 76. The downconverter 68 also receives the target-reflected carrier signal 28 via a front receiver output signal 78. The downconverter 68 uses the local oscillator reference signal 74 to convert the rear receiver output signal 78 and the front receiver output signal 78 to baseband signals 80. The baseband signals 80 are input to the FFT circuit 72 where signals are modified in preparation for processing by the receiver system computer 64. Resulting output FFT transformed baseband signals 82 are input to the receiver system computer 64.

The baseband signals 82 contain information relating to the closing rate when the received signals 24, 28 are not modulated, and information relating to a combination of the closing rate and range when the received signals 24, 28 are modulated.

The receiver computer 64 runs software for extracting range information from the combination of the closing rate and range information via the closing rate information. The extraction may be implemented via a simple subtraction procedure. The receiver system computer 64 also performs other functions such as scheduling missile arming procedures, and other sub-system control functions such as missile guidance functions and propulsion system control. Such procedures and functions benefit greatly from the range determination made via the present invention.

With reference to FIGS. 1 and 3, vector information relating to the relative positioning of the illumination system 12, the target 18 and the missile 14 is contained in the baseband signals 82. Software routines well known in the art run on the receiver system computer 64 and account for encounter geometry adjustments to range calculations performed by the software running on the receiver system computer 64.

The software includes a Doppler routine that measures a Doppler shift representative of the closing rate based on the non-modulated portions of the periodic signal 24. A time shift routine measures a time delay between the reception of a modulated portion of the periodic signal 24 by the rear receiver 62 and the reception of the modulated portion after reflection from the target 18. Information corresponding to the combination of range and closing rate is proportional to the time delay. Semi-active guidance routines well known in the art and currently in wide spread use also run on the receiver system computer 64 and ensure that the missile remains pointed at the target. The above-described software routines may be constructed by those ordinarily skilled in the art.

The receiver system computer 64 may be implemented with an ESSM Guidance Section Missile Borne Computer. The rear local oscillator 60 is easily implemented with a phase-locked loop, the construction of which is well known in the art. In addition, constructions of the downconverter 68, the front receiver 70, the rear receiver 62, and the FFT circuit 72 are well known in the art.

Those skilled in the art will appreciate that the receiver system 16 is easily adaptable for use with continuous wave and/or interrupted continuous wave illumination methods. In addition, the present invention is easily adaptable to current semi-active missile systems.

Figure 4:
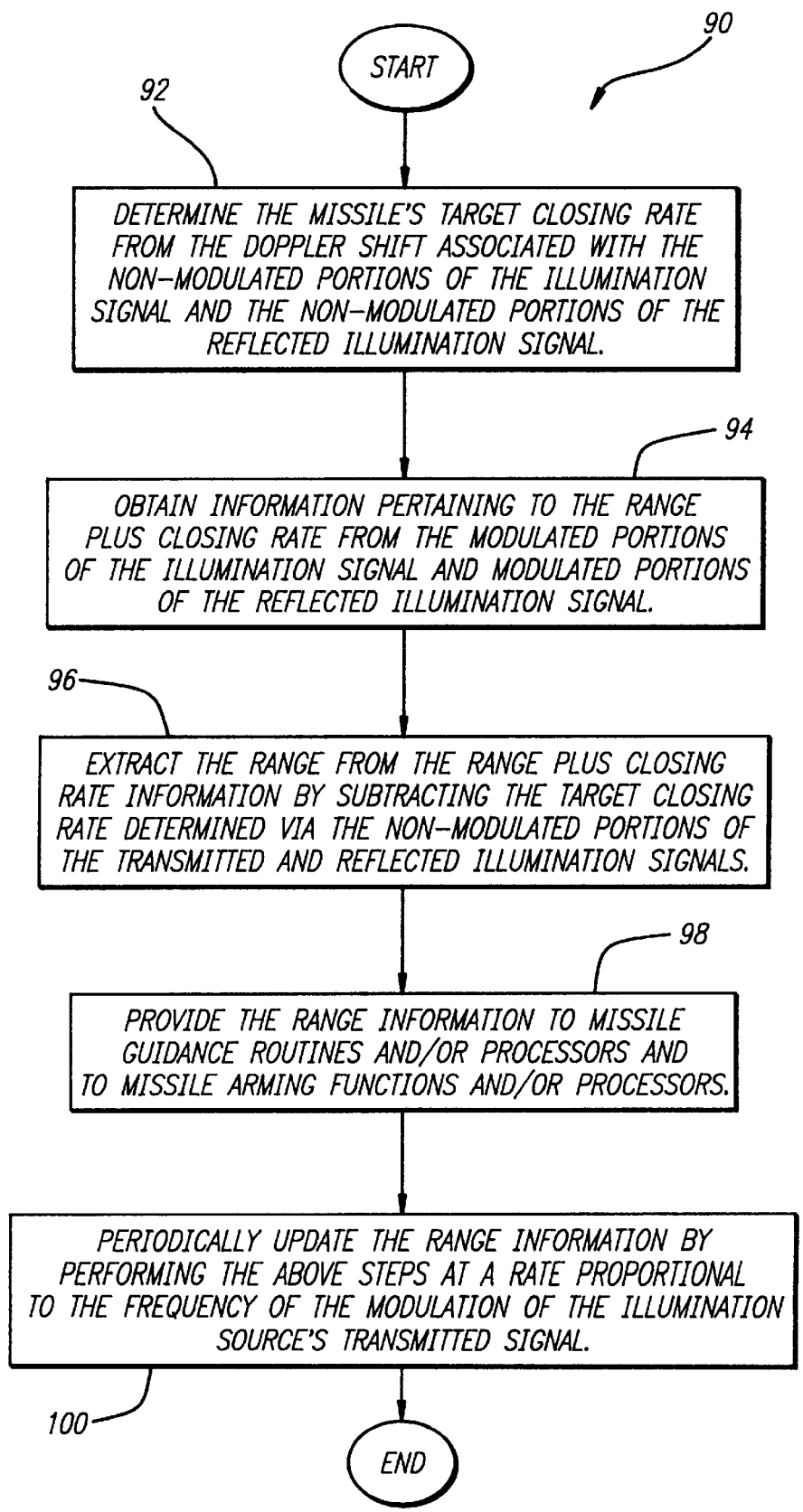
FIG. 4 is a flow diagram of the steps executed by the receiver system of FIG. 3.

FIG. 4 is a flow diagram of a method 90 executed by the receiver system 16 of FIG. 3. With reference to FIGS. 1 and 4, in an initial closing rate determination step 92, the target closing rate of the missile 14 is determined from the Doppler frequency shift associated with the non-modulated portions of the carrier signal 24 and the non-modulated portions of the reflected carrier signal 28. Subsequently, in a range and closing rate combination step 94, information pertaining to a combination of range and closing rate is obtained from the modulated portions of the carrier signal 24 and the modulated portions of the reflected carrier signal 28. Next, in a range extracting step 96, the receiver system 16 extracts the range from the combination of range and closing rate information by subtracting the closing rate determined via the non-modulated portions of the transmitted and reflected carrier signals 24 and 28. Then, in a range-providing step 98, the receiver system 16 provides the range information to missile guidance routines and/or processors and to missile arming functions and/or processors (not shown). Finally, in an updating step, the range determination is periodically updated by performing steps 92, 94, 96, and 98 at a rate proportional to the frequency of the modulation of the periodically modulated carrier signal 24.

Thus, the present invention has been described herein with reference to a particular embodiment for a particular application. Those having ordinary skill in the art and access to the present teachings will recognize additional modifications, applications and embodiments within the scope thereof It is therefore intended by the appended claims to cover any and all such applications, modifications and embodiments within the scope of the present invention.

Accordingly,

What is claimed is:

1. A system for determining the distance between a missile and a target comprising:

first means for generating a periodic signal, said signal frequency modulated at a predetermined rate;

second means for determining a closing rate at which said missile is approaching said target via said periodic signal;

third means for determining a value containing information corresponding to said distance and said closing rate via said periodic signal; and fourth means for determining said distance from said closing rate and said value.

2. The invention of claim 1 wherein said first means includes an illumination system.

3. The invention of claim 2 wherein said periodic signal is a radio frequency signal.

4. The invention of claim 2 wherein said illumination system is a microwave illumination system.

5. The invention of claim 2 wherein said illumination system includes a periodically modulated carrier signal generator for generating said periodic signal.

6. The invention of claim 5 wherein said periodically modulated carrier signal generator includes a frequency source, a frequency modulator, and an illumination system computer.

7. The invention of claim 5 wherein said illumination system computer runs software for adjusting the modulation parameters of said frequency modulator.

8. The invention of claim 1 wherein said second means includes Doppler means for measuring a Doppler shift representative of said closing rate based on a first portion of said periodic signal, said first portion characterized by a first frequency.

9. The invention of claim 1 wherein said third means includes time shift means for measuring a time delay between the reception of a second portion of said periodic signal by a receiver system in said missile and the reception by said receiver system of said second portion after reflection from said target, said second portion characterized by a second frequency.

10. The invention of claim 9 wherein said value is proportional to said time delay.

11. The invention of claim 9 wherein said receiver system includes a front receiver located near the front of said missile and a rear receiver located near the rear of said missile.

12. The invention of claim 11 wherein said missile system further includes a computer.

13. The invention of claim 12 wherein said computer runs software for implementing said fourth means.

14. The invention of claim 12 wherein said computer is a pre-existing missile borne computer.

15. The invention of claim 11 wherein said receiver system includes a local oscillator for providing a reference frequency for said receiver system.

16. The invention of claim 15 wherein said reference frequency is derived by said local oscillator from said periodic signal provided by said first means.

17. The invention of claim 15 wherein said local oscillator includes a phase-locked loop for locking to said periodic signal and providing said reference signal in response thereto.

18. The invention of claim 1 wherein said fourth means includes computer software for subtracting said closing rate from said value and providing said distance in response thereto.

19. The invention of claim 1 wherein said missile includes a receiver system.

20. The invention of claim 19 wherein said receiver system includes a computer in communication with a rear receiver and a rear local oscillator.

21. The invention of claim 20 wherein said rear local oscillator includes a phase-locked loop.

22. The invention of claim 20 wherein said rear receiver and said rear local oscillator are connected to a downconverter in said receiver system.

23. The invention of claim 22 wherein a front receiver and said rear receiver provide input to said downconverter.

24. The invention of claim 23 wherein said rear local oscillator provides a reference frequency to said downconverter, said downconverter outputting a downconverted signal in response thereto.

25. The invention of claim 24 wherein a Fast Fourier Transform circuit receives said downconverted signal and outputs a processed signal in response thereto to said computer.

26. The invention of claim 1 wherein said first means includes an illumination system having a computer in communication with a frequency source and a frequency modulator.

27. The invention of claim 26 wherein said frequency source is a radio frequency source.

28. The invention of claim 26 wherein outputs of said frequency source and said frequency modulator are input to a combiner the output of which is connected to a transmitter.

29. The invention of claim 28 wherein said computer runs software for controlling the frequency of said frequency source, and modulation parameters of said frequency modulator.

30. A system for determining the distance between a missile and a target comprising:

first means for generating a periodic signal, said periodic signal having a first component of a first constant frequency and a second component of a second varying frequency;

second means for determining a closing rate at which said missile is approaching said target from said first component; and third means for determining a value containing information corresponding to said distance between said missile and said target and said closing rate via said second component; and fourth means for determining said distance from said closing rate and said value.

31. A method for determining the distance between a missile and a target comprising the steps of:

generating a periodic signal frequency modulated at a predetermined rate;

measuring a closing rate at which said missile is approaching said periodic signal;

determining a value containing information corresponding to said distance between said missile and said target and said closing rate via said periodic signal; and calculating said distance from said closing rate and said value.

32. A semi-active missile system capable of accurately determining the distance between a missile and a target comprising:

an illumination source for outputting a first periodically modulated carrier signal;

a receiver system located on said missile and having a front and rear receiver for receiving a reflected periodically modulated carrier signal, and said first periodically modulated carrier signal, respectively;

a first software routine running on a computer, said first software routine for calculating a missile target closing rate from a non-modulated portion of said first periodically modulated carrier signal, and a non-modulated portion of said reflected periodically modulated carrier signal received by said receiver system;

a second software routine running on said computer, said second software routine for obtaining a value representative of a combination of missile target closing rate and said distance from a modulated portions of said first periodically modulated carrier signal and said reflected periodically modulated carrier signal received by said receiver system;

a third routine running on said computer for extracting said distance from said value using said missile target closing rate;

a missile propulsion system;

a missile steering system;

a guidance processor for controlling said missile propulsion system and said missile steering system to guide said missile, said guidance processor utilizing said distance to optimize missile performance; and an intercept arm function for using said distance to selectively activate the arming of said missile in response to said distance being within a predetermined distance threshold.

* * * * *